United States Patent
Hu et al.

(10) Patent No.: US 11,967,836 B2
(45) Date of Patent: Apr. 23, 2024

(54) HARMONIC CURRENT MONITORING IN A WIRELESS POWER SYSTEM

(71) Applicant: Apple Inc., Cupertino, CA (US)

(72) Inventors: Aiguo Patrick Hu, Auckland (NZ); Bo Long, Auckland (NZ); Qi Zhu, Auckland (NZ); Wynand Malan, Auckland (NZ); Patrin Illenberger, Auckland (NZ); Andrew R Connell, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/883,372

(22) Filed: Aug. 8, 2022

(65) Prior Publication Data
US 2023/0072541 A1    Mar. 9, 2023

Related U.S. Application Data

(60) Provisional application No. 63/241,391, filed on Sep. 7, 2021.

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC .. H02J 50/12; H02J 7/025; H02J 17/00; H02J 5/005; B60L 53/12–126
USPC ......................................... 307/104; 320/108
See application file for complete search history.

(56) References Cited

U.S. PATENT DOCUMENTS

| | | | |
|---|---|---|---|
| 9,618,645 B2 | 4/2017 | Irie et al. | |
| 9,865,391 B2 * | 1/2018 | Bae | H02J 50/90 |
| 10,277,062 B2 | 4/2019 | Govindaraj et al. | |
| 2013/0077361 A1 | 3/2013 | Low et al. | |
| 2014/0159501 A1 | 6/2014 | Kanno et al. | |
| 2016/0056639 A1 | 2/2016 | Mao | |
| 2017/0033591 A1 | 2/2017 | Govindaraj et al. | |
| 2018/0287405 A1 | 10/2018 | Govindaraj et al. | |
| 2018/0294681 A1 | 10/2018 | Bae | |
| 2019/0044321 A1 | 2/2019 | Misawa et al. | |
| 2021/0099018 A1 * | 4/2021 | Tabata | H02J 50/12 |

* cited by examiner

*Primary Examiner* — Daniel Kessie
*Assistant Examiner* — Terrence R Willoughby
(74) *Attorney, Agent, or Firm* — Treyz Law Group, P.C.; Joseph F. Guihan

(57) ABSTRACT

Metal object detection may be performed in a wireless power system by monitoring the 5th or other order harmonic current of a dual-frequency power transmitter driven by a voltage-fed inverter with square-wave output. While power transfer is maintained by tuning at the fundamental frequency, the transmitter circuit is tuned simultaneously at the 5th order frequency or other harmonic frequencies to increase or decrease the flow of the harmonic current for when a metal object is present. The receiver circuit may include a notch filter to filter out the 5th order frequency. With the dual-frequency tuning configuration, the presence of a metal object causes a significant drop of the increase in the harmonic current at the transmitter side while the receiver behaves as an open circuit with no effect on power transfer. The harmonic tuning circuit may be switched off as necessary to leave only the fundamental frequency for power transfer.

20 Claims, 8 Drawing Sheets

$$Z_{TX} = \frac{(R_a + j\omega L_a) \cdot 1/j\omega C_a}{R_a + j\omega L_a + 1/j\omega C_a} + j\omega L_p + \frac{1}{j\omega C_p} + R_p$$

FIG. 4

$$\begin{cases} \dfrac{j\omega_1 L_a}{1 - \omega_1^2 L_a C_a} + j\omega_1 L_p + \dfrac{1}{j\omega_1 C_p} = 0 \\ \dfrac{j\omega_5 L_a}{1 - \omega_5^2 L_a C_a} + j\omega_5 L_p + \dfrac{1}{j\omega_5 C_p} = 0 \end{cases}$$

FIG. 5

$$\begin{cases} \dfrac{j\omega_1 L_b}{1 - \omega_1^2 L_b C_b} + j\omega_1 L_s + \dfrac{1}{j\omega_1 C_s} = 0 \\ \omega_5 = \dfrac{1}{\sqrt{L_b C_b}} \end{cases}$$

FIG. 6

HARMONIC CURRENT MONITORING IN A WIRELESS POWER SYSTEM

This application claims priority to U.S. provisional patent application No. 63/241,391, filed Sep. 7, 2021, which is hereby incorporated by reference herein in its entirety.

FIELD

This relates generally to power systems, and, more particularly, to wireless power supplies for charging electronic devices.

BACKGROUND

In a wireless charging system, a wireless power transmitting device transmits wireless power to a wireless power receiving device. The wireless power transmitting device uses a wireless power transmitting coil to transmit wireless power signals to the wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

A wireless power system has a wireless power transmitting device and a wireless power receiving device. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless alternating current power to direct current power.

Metal object detection may be performed in the wireless power system by monitoring the 5th or other order harmonic current of a dual-frequency power transmitter driven by a voltage-fed inverter with square-wave output. While power transfer is maintained by tuning at the fundamental frequency, the transmitter circuit is tuned simultaneously at the 5th order frequency to ease the flow of the 5th order harmonic current for metal object detection. The receiver circuit may include a notch filter to filter out the 5th order frequency. With the proposed dual-frequency tuning configuration, the presence of a metal object between the transmitter and the receiver causes a significant drop in the 5th order harmonic current at the transmitter side while the receiver behaves as an open circuit with no effect on power transfer.

During operations of the wireless power system, control circuitry within the wireless power transmitting device may monitor the magnitude of the fifth order harmonic current and/or monitor the changes of the current waveform. If the fifth order harmonic current drops, the control circuitry may determine that a metal object is present between the transmitter and the receiver and cease wireless power transfer operations.

In another possible arrangement, the wireless power transmitting circuitry may be tuned such that the presence of a metal object causes an increase in the fifth order harmonic current. If the fifth order harmonic current increases, the control circuitry may determine that a metal object is present between the transmitter and the receiver and cease wireless power transfer operations.

BRIEF DESCRIPTION OF THE DRAWINGS

FIG. 4 is a formula for the total impedance of the illustrative transmitter of FIG. 2 in accordance with an embodiment.

FIG. 5 is two formulas showing conditions to be met by the parameter values of the illustrative dual-frequency transmitter of FIG. 2 in accordance with an embodiment.

FIG. 6 is two formulas showing conditions to be met by the parameter values of the illustrative receiver of FIG. 2 in accordance with an embodiment.

DETAILED DESCRIPTION

A wireless power system includes a wireless power transmitting device. The wireless power transmitting device wirelessly transmits power to a wireless power receiving device. The wireless power transmitting device may be a charging puck, a charging mat, a portable electronic device with power transmitting capabilities, a removable battery case with power transmitting capabilities, or other power transmitter. The wireless power receiving device may be a device such as a cellular telephone, tablet computer, laptop computer, removable battery case, electronic device accessory, wearable such as a wrist watch, or other electronic equipment. The wireless power receiving device uses power from the wireless power transmitting device for powering the receiving device and for charging an internal battery.

Wireless power is transmitted from the wireless power transmitting device to the wireless power receiving device by using an inverter in the wireless power transmitting device to drive current through one or more wireless power transmitting coils. The wireless power receiving device has one or more wireless power receiving coils coupled to rectifier circuitry that converts received wireless power signals into direct-current power.

Figure 1:
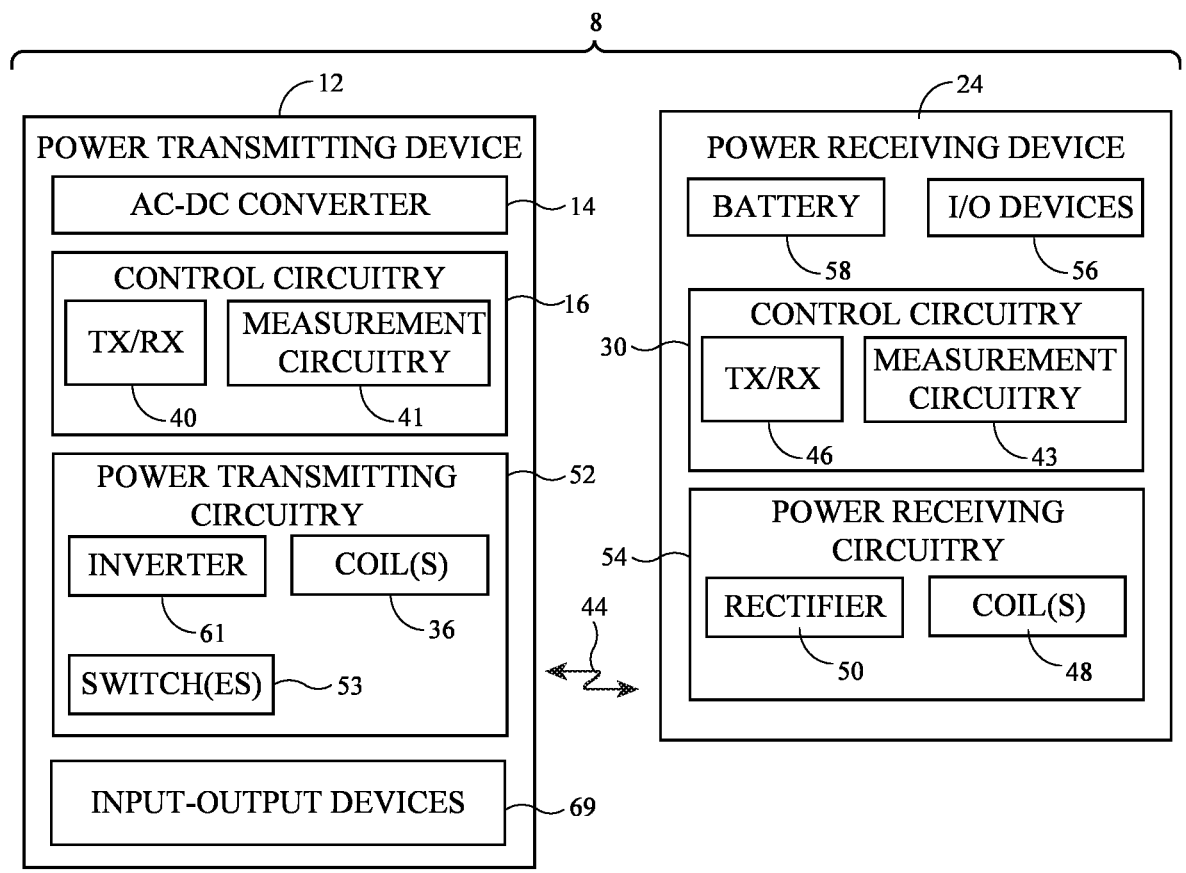
FIG. 1 is a schematic diagram of an illustrative wireless power system in accordance with an embodiment.

An illustrative wireless power system (wireless charging system) is shown in FIG. 1. As shown in FIG. 1, wireless power system 8 (sometimes referred to as inductive power transfer system 8) includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in processing user input, handling negotiations between devices 12 and 24, sending and receiving in-band and out-of-band data, making measurements, estimating power losses, determining power transmission levels, and otherwise controlling the operation of system 8.

Control circuitry in system 8 may be configured to perform operations in system 8 using hardware (e.g., dedicated hardware or circuitry), firmware and/or software. Software code for performing operations in system 8 and other data is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment.

Power receiving device 24 may be a portable electronic device such as a cellular telephone, a laptop computer, a tablet computer, a wearable such as an earbud or wrist watch, a wirelessly charged removable battery case for an electronic device, or other electronic equipment. Power transmitting device 12 may be coupled to a wall outlet (e.g., an alternating-current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may include one or more switches 53 configured to selectively switch a parallel LC tank circuit into and out of the power transmitting circuit. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Multiple coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, portable electronic device such as a cellular telephone, etc.) may have only a single coil. In other arrangements, a wireless charging device may have multiple coils (e.g., two or more coils, 2-4 coils, 5-10 coils, at least 10 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-400 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display, speaker, camera, touch sensor, ambient light sensor, and other devices for gathering user input, making sensor measurements, and/or providing user with output. Device 12 may include input-output devices 69 (e.g., any of the input-output devices described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

Control circuitry 16 has measurement circuitry 41. Measurement circuitry 41 may include voltage measurement circuitry (e.g., for measuring one or more voltages in device 12 such as a coil voltage associated with a wireless power transmitting coil) and/or current measurement circuitry (e.g., for measuring one or more currents such as a wireless power transmitting coil current). Measurement circuitry 41 may be used, as an example, to measure a fifth order or other harmonic current of the wireless power transmitting coil to identify the presence of a metal object in an active charging area of the system. Herein, harmonic frequency may refer to a harmonic frequency of the fundamental (power transmission) frequency used by power transmitting coil 36.

Control circuitry 30 has measurement circuitry 43. Measurement circuitry 43 may include voltage measurement circuitry (e.g., for measuring one or more voltages in device 24 such as a coil voltage associated with a wireless power transmitting coil and/or a rectifier output voltage) and/or current measurement circuitry (e.g., for measuring one or more currents such as wireless power receiving coil current and/or rectifier output current).

Figure 2:
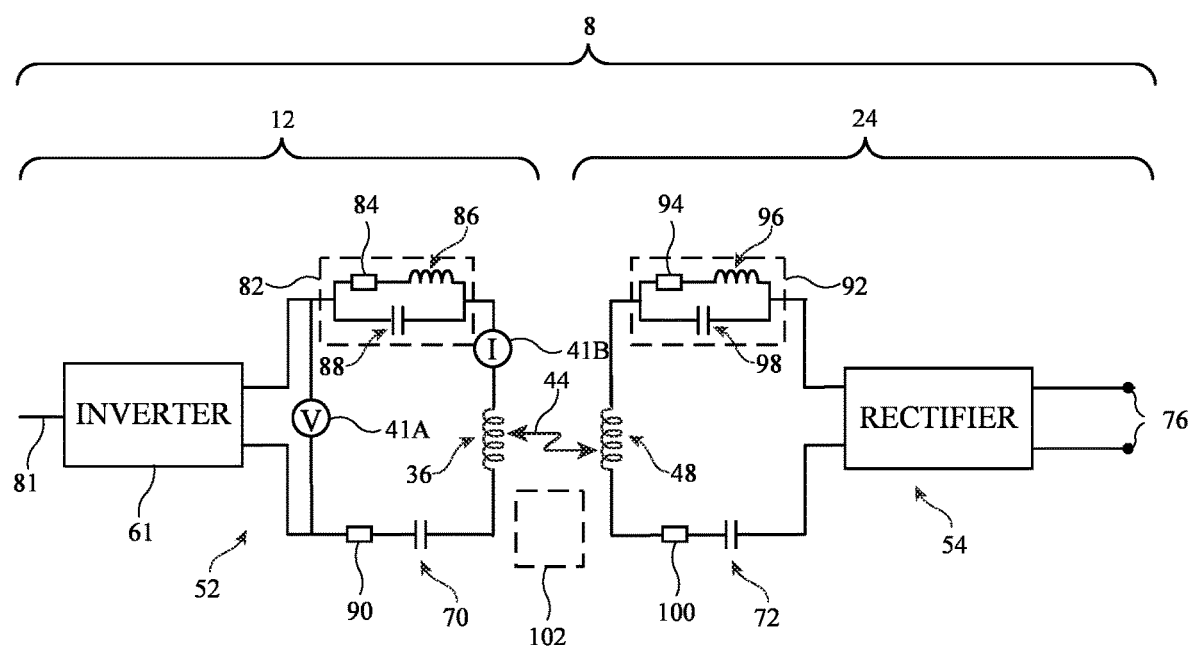
FIG. 2 is a circuit diagram of an illustrative wireless power system with fifth order harmonic based metal object detection in accordance with an embodiment.

FIG. 2 shows illustrative wireless power circuitry in system 8 in an illustrative scenario in which a wireless power transmitting device has been paired with a wireless power receiving device. The wireless power circuitry of FIG. 2 includes wireless power transmitting circuitry 52 in wireless power transmitting device 12 and wireless power receiving circuitry 54 in wireless power receiving device 24. During operation, wireless power signals 44 are transmitted by wireless power transmitting circuitry 52 and are received by wireless power receiving circuitry 54. The configuration of FIG. 2 includes a single transmitting coil 36 and a single receiving coil 48 (as an example).

As shown in FIG. 2, wireless power transmitting circuitry 52 includes inverter circuitry 61. Inverter circuitry (inverter) 61 may be used to provide signals to coil 36. During wireless power transmission, the control circuitry of device 12 supplies signals to control input 81 of inverter 61 that cause inverter 61 to supply alternating-current drive signals to coil 36. In one illustrative embodiment, inverter 61 may be a voltage-fed inverter with a square-wave output.

When alternating-current current signals are supplied to coil 36, corresponding alternating-current electromagnetic signals (wireless power signals 44) are transmitted to nearby coils such as illustrative coil 48 in wireless power receiving circuitry 54. This induces a corresponding alternating-current (AC) current signal in coil 48. Rectifier 50 receives the AC current from coil 48 and produces corresponding direct-current power (e.g., direct-current voltage Vrect) at output terminals 76. This power may be used to power a load.

If desired, some of the devices in wireless power system 8 may have both the ability to transmit wireless power signals and to receive wireless power signals. A cellular telephone or other portable electronic device may, as an example, have a single coil that can be used to receive wireless power signals from a charging puck or other wireless power transmitting device and that can also be used to transmit wireless power to another wireless power device (e.g., another cellular telephone, an accessory device, etc.). A device that can both transmit and receive wireless power may have all of the components of wireless power transmitting device 12 and all the components of wireless power receiving device 24 (e.g., power transmitting circuitry 52 and power receiving circuitry 54 are included in a single device). However, the functionality of the wireless power transmission and the wireless power reception is the same as described in connection with FIGS. 1 and 2. Therefore, although the examples herein will focus on a scenario where a dedicated wireless power transmitting device transfers wireless power to a dedicated wireless power receiving device, it should be understood that a device that both transmits and receives wireless power may be substituted for one or both devices.

In some cases, a metal object (MO) 102 may be present in an active charging area between coil 36 of device 12 and coil 48 of device 24. In other words, metal object 102 overlaps the footprint of one or both of coils 36 and 48. Metal object 102 may be an object incompatible with the wireless power system such as a coin (e.g., metal object 102 is not designed to receive wireless power signals from power transmitting device 12). Eddy currents may be induced in metal objects such as metal object 102 that are present in the active charging area. These eddy currents have the potential to reduce the efficiency of wireless power transfer between devices 12 and 24 and/or result in undesirable heating of the metal object. Device 12 and/or device 24 may therefore include circuitry that helps identify the presence of metal object 102 and take appropriate action (e.g., cease wireless power transfer operations if a metal object is determined to be present). As used herein, metal objects include objects having a metallic component that is susceptible to eddy currents induced by wireless power signals.

There are various ways that wireless power system 8 may perform metal object detection (MOD) operations. A quality factor method (in which quality factor reduction caused by metal objects is monitored) and a power loss accounting method (in which power loss caused by metal objects is monitored) are two examples of MOD techniques. However, it may be difficult to differentiate between the presence of a metal object and misalignment of coils 36 and 48 using these techniques. In other words, in some cases coil 48 may be shifted laterally relative coil 36 (e.g., the center of coil 48 is shifted relative to the center of coil 36). This may be referred to as coil misalignment. Coil misalignment may cause quality factor reduction and/or power loss. It is therefore difficult to distinguish between quality factor reduction caused by coil misalignment and quality factor reduction caused by a metal object. It is also difficult to distinguish between power loss caused by coil misalignment and power loss caused by a metal object.

The wireless power system of FIG. 2 may include circuitry that enables metal objects to be detected regardless of the alignment of the receiver coil 48 relative to the transmitter coil 36. To achieve this metal object detection, the wireless power transmitting device 12 may monitor a fifth order harmonic current of the fundamental power transmission frequency. Efficient power transfer is maintained by tuning the system at the fundamental power transmission frequency. The transmitter is also deliberately tuned at the fifth harmonic frequency to ensure metal objects can be detected regardless of the alignment of the receiver.

As shown in FIG. 2, a series tuning capacitor 70 is coupled in series with coil 36. Efficient power transfer is maintained by tuning the system at the fundamental power transmission frequency using capacitor 70. A parallel LC tank circuit 82 is also connected in series with coil 36 and capacitor 70. The parallel LC tank circuit 82 includes a capacitor 88 and an inductor 86. FIG. 2 also illustrates the equivalent series resistance (ESR) 84 associated with inductor 86 and the equivalent series resistance 90 associated with coil 36.

A series tuning capacitor 72 is coupled in series with coil 48. Efficient power transfer is maintained by tuning the system at the fundamental power transmission frequency using capacitor 72. A parallel LC tank circuit 92 is connected in series with coil 48 and capacitor 72. The parallel LC tank circuit 92 includes a capacitor 98 and an inductor 96. The parallel LC tank circuit 92 serves as a fifth order harmonic filter and may sometimes be referred to as fifth order filter 92, fifth order notch filter 92, etc. FIG. 2 also illustrates the equivalent series resistance 94 associated with inductor 96 and the equivalent series resistance 100 associated with coil 48.

In the metal object detection method of FIG. 2, the fifth order harmonic component from the input square wave voltage (e.g., provided by inverter 61) is utilized to detect the presence of a metal object while wireless power is simultaneously transferred via the fundamental frequency. A dual-frequency channel of the fundamental and fifth order frequencies is constructed in the power transmitting device 12. In contrast, the power receiving device 24 offers a low impedance channel at the fundamental frequency and a high impedance at the fifth order frequency (due to the presence of the fifth order harmonic filter). Therefore, any variation of the fifth order harmonic component in the power transmitting circuitry 52 is only related to the presence of the metal object (and not the presence of power receiving device 24).

Measurement circuitry 41 in device 12 may make measurements on operating currents and voltages in device 12. For example, voltage sensor 41A may be used to measure the coil voltage across coil 36 and current sensor 41B may be used to measure the coil current through coil 36. In other implementations, voltage across capacitor 70 is measured and current through the coil is inferred from that measurement.

The aforementioned example of using the fifth harmonic for metal object detection is merely illustrative. If desired, other harmonics may be used for the metal object detection. However, the fifth order frequency may be preferred to the third harmonic for the metal object detection scheme because its lower amplitude causes less standby loss and the fifth harmonic requires smaller tuning components than if the third harmonic was used. The magnitudes of harmonics higher than the fifth order may be lower than desired for signal processing. Moreover, tuning component values will greatly deviate from nominal values with increasing frequency. However, in general, depending on the specific wireless power system, any desired harmonic frequency may be used for the metal object detection operations.

Figure 3A:
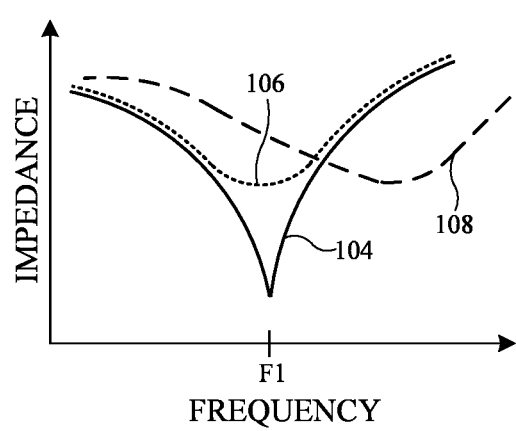
FIGS. 3A and 3B are graphs of the input impedance of the illustrative system of FIG. 2 as a function of frequency under difference scenarios in accordance with an embodiment.
Figure 3B:
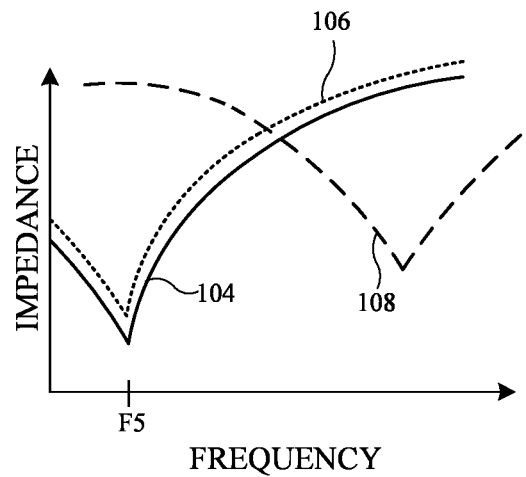

FIGS. 3A and 3B are graphs of the input impedance of the system as a function of frequency under difference scenarios. FIG. 3A shows the impedance response around the fundamental frequency $f_1$. FIG. 3B shows the impedance response around the fifth harmonic frequency $f_5$ (where $f_5=5f_1$). The system may have local minima in impedance at (or near) both $f_1$ and $f_5$. For both FIGS. 3A and 3B, profile 104 shows the impedance response when the wireless power transmitting device 12 operates without a corresponding wireless power receiving device 24, profile 106 shows the impedance response when wireless power receiving device 24 is present on wireless power transmitting device 12, and profile 108 shows the impedance response when both wireless power receiving device 24 and metal object 102 are present on wireless power transmitting device 12.

As shown in FIGS. 3A and 3B, profile 104 (when neither power receiving device 24 nor metal object 102 are present) has a minimum at both $f_1$ and $f_5$. After the power receiving device is added into the system (as shown by profile 106), the system input impedance at the fundamental frequency $f_1$ is increased due to the existence of the output load. However, the system input impedance at the 5th order frequency $f_5$ is kept unchanged because of the presence of the 5th order filter at the receiver side.

When one or more MOs are present in the wireless power system (as shown by profile 108), the system input impedance has a significant increase in magnitude at the 5th order frequency. This unique change of the 5th order harmonic (e.g., a change caused by a metal object but not by power receiving device 24) can be used for monitoring the presence of a metal object. The presence of the 5th order filter at the receiver side can help the wireless power system identify the intrusion of metal objects by monitoring the significant impedance variation at the 5th order frequency regardless of the position of the receiver relative to the transmitter.

The total impedance of the transmitter may be expressed using the formula of FIG. 4, where $Z_{TX}$ is the total impedance of the transmitter, $R_a$ is the magnitude of equivalent series resistance 84, j is the square root of −1, ω is the system angular frequency, $L_a$ is the inductance of inductor 86, $C_a$ is the capacitance of capacitor 88, $L_p$ is the inductance of coil 36, $C_p$ is the capacitance of capacitor 70, and $R_p$ is the magnitude of equivalent series resistance 90.

The magnitudes of ESRs Ra and Rp are much smaller than their reactances. Accordingly, the ESRs may be ignored to simplify the resonance conditions of the transmitter circuit. After simplification, the parameter values of the dual-frequency transmitter of FIG. 2 should satisfy the two equations in FIG. 5.

In FIG. 5, j is the square root of −1, $\omega_1$ is the fundamental angular frequency of the input voltage provided by the inverter, cos is the fifth order angular frequency of the input voltage provided by the inverter (where $\omega_5=5\omega_1$), $L_a$ is the inductance of inductor 86, $C_a$ is the capacitance of capacitor 88, $L_p$ is the inductance of coil 36, and $C_p$ is the capacitance of capacitor. Selecting values for $\omega_1$, $L_a$, $L_p$, $C_a$, and $C_p$ that satisfy the two equations of FIG. 5 results in the system being tuned to both $\omega_1$ and $\omega_5$. In other words, wireless power transmitting circuitry that meets the conditions of FIG. 5 (such as circuitry 52 in FIG. 2) is dual-tuned to both the fundamental frequency and fifth order harmonic frequency.

Wireless power receiving circuitry 54 uses a notch filter to block the fifth order harmonic components from the wireless power transmitting circuitry 52 and distinguish the receiver 24 from metal objects. The wireless power receiving circuitry 54 may also have series resonance at the fundamental frequency to maximize power transfer. The parameters of the wireless power transmitter circuitry may satisfy the equations of FIG. 6, where j is the square root of −1, $\omega_1$ is the fundamental angular frequency, $\omega_5$ is the fifth order angular frequency of the input voltage provided by the inverter (where $\omega_5=\omega_1$), $L_b$ is the inductance of inductor 96, $C_b$ is the capacitance of capacitor 98, $L_s$ is the inductance of coil 48, and $C_s$ is the capacitance of capacitor 72.

When satisfying the equations of FIG. 6, the receiver circuit is equivalent to a series-compensation circuit at the fundamental frequency and an open-circuit at the 5th order harmonic frequency, respectively. Therefore, the presence of such a receiver circuit will not affect the system input impedance at the 5th order frequency, ensuring a unique response to the presence of metal object 102.

Figure 7:
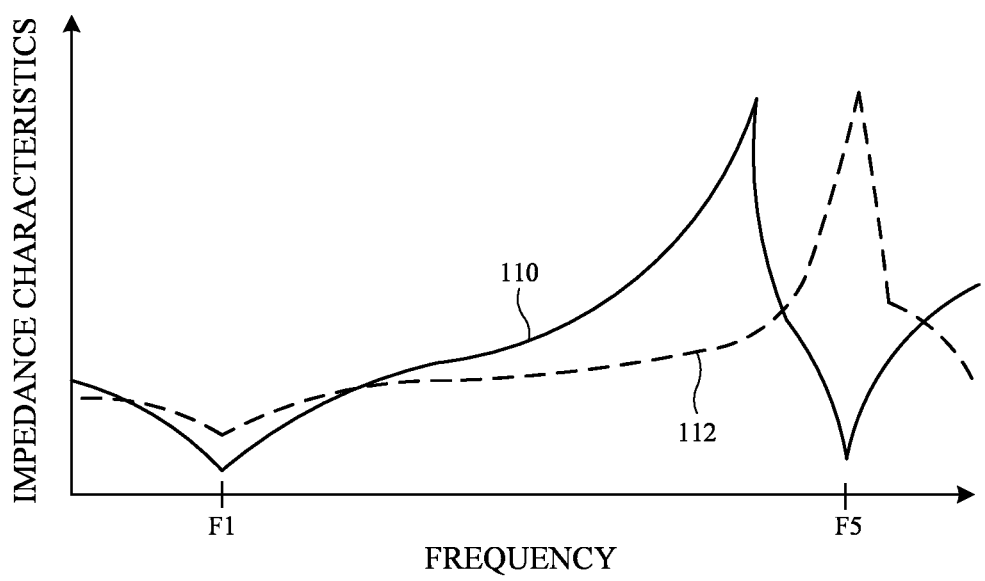
FIG. 7 is a graph showing impedance characteristics of the illustrative system of FIG. 2 as a function of frequency in accordance with an embodiment.

FIG. 7 is a graph of impedance characteristic curves for power transmitting circuitry and power receiving circuitry that satisfy the conditions of FIGS. 5 and 6. Profile 110 shows the impedance characteristics of wireless power transmitting circuitry 52 that meets the conditions of FIG. 5. Profile 112 shows the impedance characteristics of wireless power receiving circuitry 54 that meets the conditions of FIG. 6. As shown in FIG. 7, both the transmitter and receiver circuits have an impedance trough at the fundamental frequency $f_1$. However, the transmitter circuit has the lowest impedance at the 5th order frequency $f_5$ while the receiver circuit provides an extremely high impedance at $f_5$. Therefore, the presence of a metal object triggers a drop in fifth order current in the power transmitting device whereas the presence of power receiving device 24 does not trigger a drop in fifth order current in the power transmitting device.

During operation, the fifth order harmonic current in wireless power transmitting circuitry 52 may be monitored (e.g., using information from current sensor 41B in FIG. 2). The presence of a metal object between the transmitting coil 36 and receiving coil 48 may cause the fifth order current to drop (due to the increase in $5^{th}$ order input impedance). Control circuitry within wireless power transmitting device 12 may take suitable action (e.g., cease or reduce wireless power transfer) in response to detecting the drop in the fifth order current.

The control circuitry may identify the presence of a metal object using information from voltage sensor 41A and/or current sensor 41B. A waveform measured by current sensor 41B (e.g., the current through coil 36 over time) may be used by control circuitry 16 to determine the amplitude of the fifth order harmonic current. As an example, a fast Fourier transform (FFT) may be used to determine the fifth order harmonic current using the current waveform from sensor 41B. In one illustrative embodiment, control circuitry 16 in power transmitting device 12 may compare a ratio of the fifth order current to the input DC voltage. If the ratio is below a threshold, it is understood that the fifth order current has dropped due to the presence of a metal object. If the ratio is above the threshold, it is understood that no metal object is present. It should be noted that if the ratio is too high (e.g., above a second, higher threshold), the transmitter current is regarded as too large and the wireless power transfer operations may cease in order to mitigate over current scenarios, regardless of whether a metal object is present or not.

The example of using a FFT and the fifth order harmonic current to determine whether the metal object is present is merely illustrative. In general, any desired signal processing may be performed on the current waveform for coil 36 to determine whether a metal object is present. Other possible signal processing techniques may include deriving the impedance from the current waveform and using the impedance to determine if the metal object is present or deriving the quality factor from the current waveform and using the quality factor to determine if the metal object is present.

If desired, additional switches (switching circuitry) may optionally be included in the power transmitting circuitry of FIG. 2 to selectively switch the parallel LC tank circuit 82 into and out of the power transmitting circuit. The switches may have a first arrangement in which the parallel LC tank circuit is included in the power transmitting circuit and the power transmitting circuit can monitor the $5^{th}$ harmonic frequency for metal object detection. The switches may have a second arrangement in which the parallel LC tank circuit is not included in the power transmitting circuit. The second arrangement may be used, for example, to reduce power loss when metal object detection is not required. The switches may selectively be placed in the first arrangement when metal object detection is required.

Figure 8:
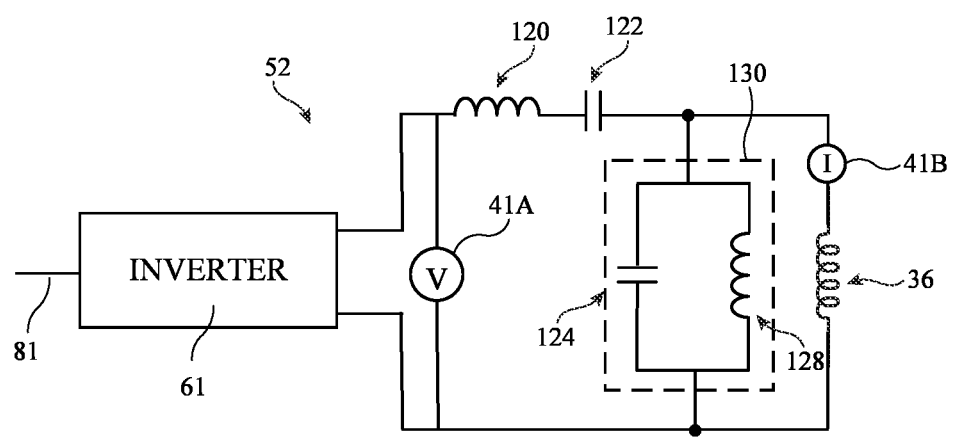
FIG. 8 is a circuit diagram of illustrative wireless power transmitting circuitry with harmonic based metal object detection in accordance with an embodiment.

In the aforementioned examples, the $5^{th}$ order harmonic current drops in response to the presence of a metal object between the power transmitting device and the power receiving device. However, this scheme may be inverted if desired, with the tuning of the wireless power transmitting circuitry selected such that the $5^{th}$ harmonic current increases in response to the presence of a metal object between the power transmitting device and power receiving device. FIG. 8 is a circuit diagram of illustrative power transmitting circuitry 52 of this type.

As shown in FIG. 8, a series tuning inductor 120 and capacitor 122 are coupled in series with coil 36. Efficient power transfer may be maintained by tuning the system at the fundamental power transmission frequency using capacitor 122. Additionally, a parallel LC tank circuit 130 is connected in parallel with coil 36. Parallel LC tank circuit 130 includes a capacitor 124 and an inductor 128.

The example in FIG. 8 is merely illustrative. In FIG. 8, capacitor 122 is placed between LC tank circuit 130 and inductor 120. Alternatively, capacitor 122 may be placed between LC tank circuit 130 and coil 36. Depending on the tuning design, the current sensor 41B may be placed between coil 36 and LC tank circuit 130, between inverter 61 and inductor 120, or at any other desired location within the wireless power transmitting circuitry.

Figure 9:
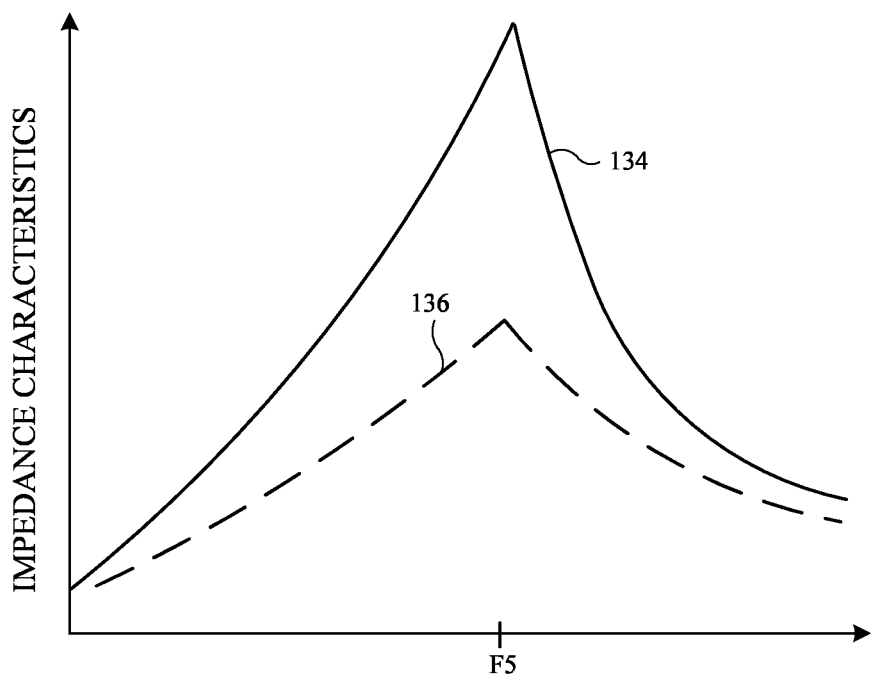
FIG. 9 is a graph of the impedance of the wireless power transmitting circuitry of FIG. 9 as a function of frequency under difference scenarios in accordance with an embodiment.

FIG. 9 shows the impedance response around the fifth harmonic frequency $f_5$ (where $f_5=5f_1$) for the wireless power transmitting circuitry in FIG. 8. As shown, the wireless power transmitting circuitry may have local maxima in impedance at (or near) $f_5$. Profile 134 shows the impedance response when wireless power receiving device 24 is present on wireless power transmitting device 12 (without a metal object) and profile 136 shows the impedance response when both wireless power receiving device 24 and metal object 102 are present on wireless power transmitting device 12.

As shown in FIG. 9, when one or more MOs are present in the wireless power system (as shown by profile 136), the system input impedance has a decrease in magnitude at the 5th order frequency. This unique change of the 5th order harmonic (e.g., a change caused by a metal object but not by power receiving device 24) can be used for monitoring the presence of a metal object. The reduced impedance in the presence of the metal object causes an increase in fifth order current in the presence of the metal object. Accordingly, a measured increase of the fifth order current in real time may indicate that a metal object has been added to the wireless power system.

Control circuitry may identify the presence of a metal object using information from voltage sensor 41A and/or current sensor 41B in FIG. 8. A waveform measured by current sensor 41B (e.g., the current through coil 36 over time) may be used by control circuitry 16 to determine the amplitude of the fifth order harmonic current. As an example, a fast Fourier transform (FFT) may be used to determine the fifth order harmonic current using the current waveform from sensor 41B. In one illustrative embodiment, control circuitry 16 in power transmitting device 12 may compare a ratio of the fifth order current to the input DC voltage. If the ratio is above a threshold, it is understood that the fifth order current has increased due to the presence of a metal object. If the ratio is below the threshold, it is understood that no metal object is present.

The example described for the wireless power transmitting circuitry of FIG. 8 of using a FFT and the fifth order harmonic current to determine whether the metal object is present is merely illustrative. In general, any desired signal processing may be performed on the current waveform for coil 36 to determine whether a metal object is present. Additional signal processing techniques may include deriving the impedance from the current waveform and using the impedance to determine if the metal object is present or deriving the quality factor from the current waveform and using the quality factor to determine if the metal object is present.

The power transmitting circuitry 52 (and corresponding power transmitting device 12) of FIG. 8 is operable with power receiving circuitry 54 (and a corresponding power receiving device 24) similar to as already shown and described in connection with FIG. 2. If the wireless power transmitting circuitry 52 has an increase in current at a given harmonic frequency when a metal object is present, power receiving device 24 has a notch filter at the given harmonic frequency to avoid the power receiving device 24 triggering a metal object detection.

If desired, additional switches (switching circuitry) may optionally be included in the power transmitting circuitry of FIG. 8 to selectively switch the parallel LC tank circuit 130 into and out of the power transmitting circuit. The switches may have a first arrangement in which the parallel LC tank circuit is included in the power transmitting circuit and the power transmitting circuit can monitor the $5^{th}$ harmonic frequency for metal object detection. The switches may have a second arrangement in which the parallel LC tank circuit is not included in the power transmitting circuit. The second arrangement may be used, for example, to reduce power loss when metal object detection is not required. The switches may selectively be placed in the first arrangement when metal object detection is required.

Figure 10:
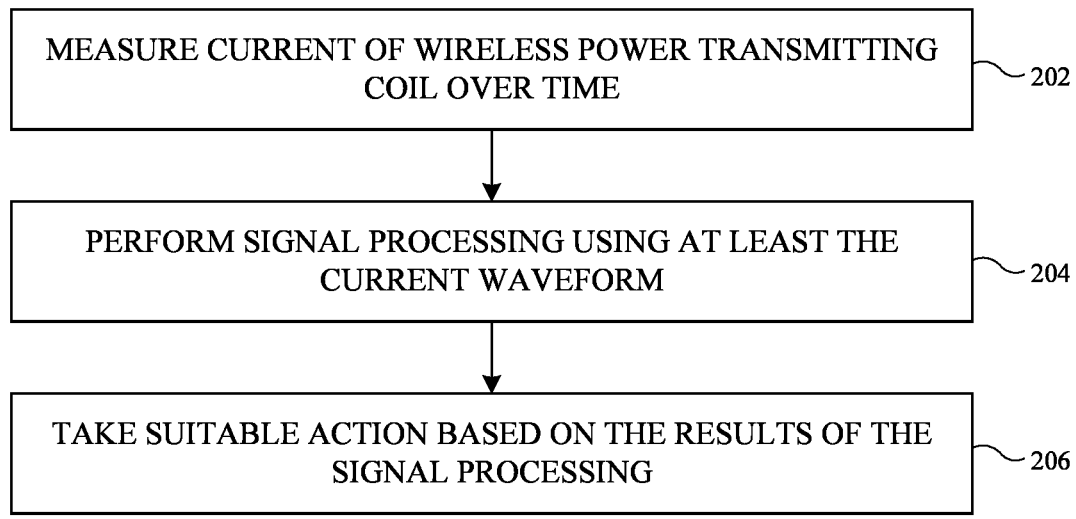
FIG. 10 is a flowchart of illustrative operations for operating a wireless power transmitting device with harmonic metal object detection capabilities in accordance with an embodiment.

FIG. 10 is a flowchart of illustrative operations for operating a wireless power transmitting device with harmonic metal object detection capabilities such as device 12 in FIG. 2 or a device with the wireless power transmitting circuitry in FIG. 8. During the operations of block 202, the current through coil 36 in wireless power transmitting circuitry 52 may be measured over time. The current may be measured by current sensor 41B in FIG. 2 or current sensor 41B in FIG. 8, as examples.

During the operations of block 204, signal processing may be performed using at least the current waveform obtained in block 202. There are many possible signal processing techniques that may be used in block 204. As previously described, signal processing such as a fast Fourier transform may be performed to determine the magnitude of a harmonic current (e.g., the fifth order harmonic). The magnitude of the harmonic current may then optionally be used for additional signal processing. The magnitude of the harmonic current or the waveform distortion factors may be used to determine if a metal object is present.

As one specific example, a ratio between the fifth order current and the DC input voltage (e.g., the input voltage to the inverter) may be determined. The determined ratio may be compared to one or more thresholds. For example, a valid charging region may be defined as current to voltage ratios greater than a first threshold $TH_1$ and less than a second threshold $TH_2$. Therefore, the determined ratio may be compared to first and second thresholds $TH_1$ and $TH_2$ during the operations of block 204.

Alternatively, signal processing may be performed to derive the impedance of the wireless power transmitting circuit 52 using at least the current waveform from block 202. As yet another alternative, signal processing may be performed to derive the quality factor for the wireless power transmitting circuit 52 using at least the current waveform from block 202. The derived impedance and/or the derived quality factor may be used to determine if a metal object is present.

During the operations of block 206 control circuitry in wireless power transmitting device 12 may take suitable action based on the results from the signal processing in block 204. The results of the signal processing may indicate, for example, whether or not a metal object is present between the power transmitting device and the power receiving device. For example, for the system of FIG. 2 where a metal object causes a drop in current at the fifth harmonic, if the measured current to voltage ratio is less than the first threshold $TH_1$, it is understood that a metal object is present. In this case, control circuitry 16 may cease wireless power transfer operations.

In some embodiments, when power transfer operations are ceased (e.g., because a metal object is determined to likely be present), control circuitry 16 may generate an alert to notify the user. The alert may be, for example, a visual alert displayed on power receiving device 24 or an auditory alert emitted by power receiving device 24. For example, power transmitting device 12 may convey the alert to power receiving device 24 using in-band communication. Power receiving device 24 may then display a visual alert using a display, emit an auditory alert using a speaker, or convey a tactile alert using a haptic output device. Power receiving device 24 may convey the alert using any desired component (i.e., input-output devices 56 such as a display or audio components). Alternatively, power transmitting device 12 may use one or more of input-output components 69 (i.e., a display, audio, or haptic component) to convey the alert to the user.

As another example, for the system of FIG. 8 where a metal object causes an increase in current at the fifth harmonic, if the measured current to voltage ratio is greater than a threshold $TH_1$, it may be determined that a metal object is present. Alternatively, if the measured harmonic current is greater than a threshold, it may be determined that a metal object is present. When it is determined that a metal object is present, control circuitry 16 may cease wireless power transfer operations.

For the system of FIG. 2, if the measured current to voltage ratio is between thresholds $TH_1$ and $TH_2$, wireless power transfer operations may continue to be performed (because the system is in a valid charging region). If desired, the power transfer rate may be increased if the measured current to voltage ratio is between thresholds $TH_1$ and $TH_2$. If the measured current to voltage ratio is greater than the second threshold $TH_2$, the power system may be in an over-rating shutdown region. Accordingly, control circuitry 16 may cease wireless power transfer operations in this scenario. As previously described, when power transfer operations are ceased, control circuitry 16 may generate an alert to notify the user.

The example of determining a ratio between fifth order current and input voltage is merely illustrative. In an alternate arrangement, control circuitry 16 may take suitable action based on the fifth order current (without determining the ratio). For example, control circuitry 16 may compare the fifth order current to one or more thresholds. If the fifth order current is below a threshold (for FIG. 2) or above a threshold (for FIG. 9), it may be determined that a metal object is present and wireless power transfer operations may be ceased. As another example, control circuitry 16 may monitor the fifth order current for changes. If the fifth order current drops (for FIG. 2) or increases (for FIG. 9) by more than a threshold amount, it may be determined that a metal object is present and wireless power transfer operations may be ceased.

It is reiterated that the use of the fifth order harmonic for metal object detection is merely illustrative. In general, any desired harmonic (e.g., d $3^{rd}$, $5^{th}$, $7^{th}$, etc.) may be used for the metal object detection using any of the aforementioned current, impedance, and waveform detection techniques.

The foregoing is merely illustrative and various modifications can be made to the described embodiments. The foregoing embodiments may be implemented individually or in any combination.

What is claimed is:

1. A wireless power system comprising:
   a wireless power transmitting device comprising:
   a power transmitting coil that is configured to transmit wireless power signals;
   inverter circuitry coupled to the power transmitting coil; and
   a parallel LC tank circuit and a capacitor connected to the power transmitting coil that tune the power transmitting coil to a fundamental frequency and a harmonic frequency; and
   a wireless power receiving device comprising:
   a power receiving coil that is configured to receive the wireless power signals, wherein the power receiving coil is tuned to the fundamental frequency; and
   a notch filter coupled to the power receiving coil that filters out the harmonic frequency.

2. The wireless power system of claim 1, wherein the harmonic frequency is a fifth harmonic frequency.

3. The wireless power system of claim 1, wherein the harmonic frequency is a third harmonic frequency.

4. The wireless power system of claim 1, wherein the power transmitting coil is connected in series with the parallel LC tank circuit.

5. The wireless power system of claim 4, wherein the parallel LC tank circuit and the power transmitting coil are connected in series with the capacitor.

6. The wireless power system of claim 1, wherein the wireless power transmitting device further comprises:
   one or more switches operable in a first arrangement in which the parallel LC tank circuit is connected in series with the power transmitting coil and a second arrangement in which the parallel LC tank circuit is not connected to the power transmitting coil.

7. The wireless power system of claim 1, wherein the notch filter comprises a parallel LC tank circuit that is connected in series with the power receiving coil.

8. The wireless power system of claim 7, wherein the parallel LC tank circuit and the power receiving coil are connected in series with a tuning capacitor.

9. The wireless power system of claim 1, wherein the power transmitting coil is connected in parallel with the parallel LC tank circuit.

10. The wireless power system of claim 9, wherein the power transmitting coil is connected in series with the capacitor.

11. The wireless power system of claim 1, wherein the wireless power transmitting device further comprises:
    one or more switches operable in a first arrangement in which the parallel LC tank circuit is connected in parallel with the power transmitting coil and a second arrangement in which the parallel LC tank circuit is not connected to the power transmitting coil.

12. The wireless power system of claim 1, wherein the wireless power transmitting device is configured to cease wireless power transfer operations based at least on a current magnitude at the harmonic frequency.

13. The wireless power system of claim 1, wherein the notch filter is coupled between the power receiving coil and a rectifier.

14. A wireless power system comprising:
    a wireless power transmitting device comprising:
    a power transmitting coil that is configured to transmit wireless power signals at a fundamental frequency; and
    control circuitry configured to determine a current magnitude at a harmonic frequency using at least information from a voltage sensor or a current sensor; and
    a wireless power receiving device comprising:
    a power receiving coil that is configured to receive the wireless power signals, wherein the power receiving coil is tuned to the fundamental frequency; and
    a notch filter coupled to the power receiving coil that filters out the harmonic frequency.

15. The wireless power system of claim 14, wherein the harmonic frequency is a third harmonic frequency.

16. The wireless power system of claim 14, wherein the harmonic frequency is a fifth harmonic frequency.

17. The wireless power system of claim 14, wherein the wireless power transmitting device is configured to cease wireless power transfer operations based on the current magnitude at the harmonic frequency.

18. A wireless power transmitting device, comprising:
    a power transmitting coil that is configured to transmit wireless power signals;
    inverter circuitry coupled to the power transmitting coil;
    a tuning capacitor that is connected in series with the power transmitting coil;
    a parallel LC tank circuit; and
    one or more switches operable in a first arrangement in which the parallel LC tank circuit is connected to the power transmitting coil and the power transmitting coil is tuned to a fundamental frequency and a harmonic frequency and a second arrangement in which the parallel LC tank circuit is not connected to the power transmitting coil and the power transmitting coil is tuned to the fundamental frequency.

19. The wireless power transmitting device of claim 18, wherein the parallel LC tank circuit is connected in series to the power transmitting coil when the one or more switches have the first arrangement.

20. The wireless power transmitting device of claim 18, wherein the parallel LC tank circuit is connected in parallel to the power transmitting coil when the one or more switches have the first arrangement.

* * * * *